(12) United States Patent
Shen et al.

(10) Patent No.: US 10,825,113 B2
(45) Date of Patent: Nov. 3, 2020

(54) METHOD FOR SHORT-TERM GENERATION SCHEDULING OF CASCADE HYDROPOWER PLANTS COUPLING CLUSTER ANALYSIS AND DECISION TREE

(71) Applicant: DALIAN UNIVERSITY OF TECHNOLOGY, Dalian, Liaoning Province (CN)

(72) Inventors: Jianjian Shen, Dalian (CN); Chuntian Cheng, Dalian (CN); Nannan Zhang, Dalian (CN); Congtong Zhang, Dalian (CN)

(73) Assignee: DALIAN UNIVERSITY OF TECHNOLOGY, Dalian, Liaoning (CN)

( * ) Notice: Subject to any disclaimer, the term of this patent is extended or adjusted under 35 U.S.C. 154(b) by 0 days.

(21) Appl. No.: 16/609,177

(22) PCT Filed: Mar. 16, 2018

(86) PCT No.: PCT/CN2018/079311
§ 371 (c)(1),
(2) Date: Oct. 28, 2019

(87) PCT Pub. No.: WO2019/174040
PCT Pub. Date: Sep. 19, 2019

(65) Prior Publication Data
US 2020/0090285 A1 Mar. 19, 2020

(51) Int. Cl.
*G05B 13/02* (2006.01)
*G05B 13/04* (2006.01)
(Continued)

(52) U.S. Cl.
CPC ......... *G06Q 50/06* (2013.01); *G05B 13/0265* (2013.01); *G05B 13/041* (2013.01); *G06N 5/003* (2013.01); *G06Q 10/06314* (2013.01)

(58) Field of Classification Search
CPC .. G05B 13/0265; G05B 13/041; G06N 5/003; G06Q 10/06314; G06Q 50/06
See application file for complete search history.

(56) References Cited

U.S. PATENT DOCUMENTS

2017/0039659 A1* 2/2017 Liu .................. G06Q 10/06315

FOREIGN PATENT DOCUMENTS

| CN | 102296562 A | 12/2011 |
| CN | 105809272 A | 12/2011 |

OTHER PUBLICATIONS

Shen, Jianjian, "Short-Term Optimal Operation for Large-Scale Hydropower Plants", Chinese Doctoral Dissertations Full-text Database (Engineering Science & Technology II),No. 5, May 15, 2012.
(Continued)

*Primary Examiner* — Michael J Huntley
(74) *Attorney, Agent, or Firm* — Muncy, Geissler, Olds & Lowe, P.C.

(57) ABSTRACT

The invention relates to the field of hydropower scheduling, and relates to a method for short-term generation scheduling of cascade hydropower plants coupling cluster analysis and decision tree. Linear regression technique is adopted to determine a matching relationship of energy production between upstream and downstream hydropower plants. With the relationship, typical generation curves of each hydropower plant can be clustered from lots of historical data. These typical generation curves and impact factors of generation scheduling such as planned daily electricity, reservoir level, and power grid characteristics, are together trained to obtain decision-making library for generation scheduling of cascaded hydropower plants. Thus, the decision tree method can be used to rapidly determine an operational scheme for generation scheduling of cascaded hydropower plants. Finally, a correction strategy for operation constraints is introduced to ensure feasibility of the
(Continued)

operation scheme. The invention can quickly obtain generation schedules of cascade hydropower plants.

3 Claims, 6 Drawing Sheets

(51) Int. Cl.
*G06Q 50/06* (2012.01)
*G06N 5/00* (2006.01)
*G06Q 10/06* (2012.01)

(56) References Cited

OTHER PUBLICATIONS

Xu, Wei, "Research on Optimization Operation Models for Cascaded Hydropower Reservoirs Considering Medium Range Forecasting Inflow and Uncertainty", Chinese Doctoral Dissertations Full-text Database (Engineering Science & Technology II)),No. 7, Jul. 15, 2015.

* cited by examiner

METHOD FOR SHORT-TERM GENERATION SCHEDULING OF CASCADE HYDROPOWER PLANTS COUPLING CLUSTER ANALYSIS AND DECISION TREE

TECHNICAL FIELD

The invention relates to the field of hydropower scheduling, focusing on a method for short-term generation scheduling of cascade hydropower plants coupling cluster analysis and decision tree.

BACKGROUND

Large-scale hydropower systems in southwest China are generally developed as cascaded hydropower plants with one reservoir. They are commonly characterized as a large-size upstream reservoir with good regulation performance and a downstream hydropower plant or multiple ones with high water head, small storage capacity and poor regulation ability. The purpose is to make full use of regulation and storage of the "leading" reservoir in order to enhance overall water utilization efficiency of cascaded hydropower system. Among such hydropower systems with one reservoir and multiple hydropower plants, there are parts who are flow- or head-sensitive, such as Tianshengqiao cascaded hydropower plants on the mainstream of Hongshui River. As downstream hydropower plant is highly sensitive to outflow from the leading reservoir, scheduling short-term generation scheduling and actual operations of such a cascaded hydropower plants faces great difficulties. They are mainly reflected in the following. 1) The downstream hydropower plant has poor regulation ability, so small change of outflow from the leading reservoir may lead to large fluctuations of water level of the downstream plant. For example, a deviation of 10 $m^3$/s in average outflow of the first reservoir of Tianshengqiao cascaded hydropower system will cause large fluctuation of water level of the immediately downstream hydropower plant, with about 1 m. The key of this problem is how to match the energy production and generation profile of the upstream and downstream hydropower plants. Improper matching will easily lead to spilled water or storage lack in the downstream hydropower plant. 2) Large-scale cascaded hydropower plants are usually characterized as high water head and multiple restricted zones. Generating units have multiple irregular restricted zones varying with water head. Because of complex peak-shaving requirements from multiple power grids, the hydropower plants face large fluctuation of water head during one day. This situation easily causes changes of generation, water head, and flow of upstream and downstream hydropower plants at related periods, and thus makes it difficult to predict operation mode of cascaded hydropower plants. The generation units often cross vibration zones or run in the restricted zones for a long time, threatening operation safety of power plants and power grids. 3) Dam height and water head of these hydropower plants are commonly more than 100 m even 200 m. As generating efficiency is closely related to changes of power discharge, generation and water head, generation scheduling in actual operations needs to consider high requirements in order to avoid big head loss and keep high generating efficiency. These requirements include generation climb and descend, operation range of generation, and even fixed ideal generation values, significantly increasing complexity of optimization model.

A lot of research work has begun to focus on generation scheduling of the above flow- or head-sensitive cascaded hydropower plants. There are three main types of studies. 1) From the view of hydropower projects, short-term optimization models for head-sensitivity cascaded hydropower plants were proposed, with a major consideration of hydraulic connection of upstream and downstream hydropower plants and nonlinear relationship between power generation and water head. However, some simplifications easily cause large errors when the optimization model is applied to other cascaded hydropower plants. For example, power efficiency coefficient is simplified as a linear function of water head; water head is simplified as a linear function of reservoir storage of upstream and downstream plants; maximum outflow is simplified as a linear function of water head. Especially, the errors in water head or flow will have great influence to the generation scheduling of downstream hydropower plant. 2) The problem of estimating daily initial water level of a downstream hydropower plant is studied. Correlation between outflows from the downstream daily regulating plant and the upstream leading reservoir was analyzed by using a fuzzy clustering method. A practical strategy for estimating the daily initial water level was developed, which is helpful to improve execution level of generation schedules of downstream daily regulating hydropower plants. 3) Mathematically, optimization models for generation scheduling of such kind of cascaded hydropower plants were formulated. Thus, solving the models can directly obtain generation schedules of cascade hydropower plants. However, deviations of model description and operation requirements often make optimization results difficult to accurately reflect the actual requirements. They are inconsistent with operation habit, so application of the model in engineering is hindered. In fact, hydropower system operations are a typical engineer problem. Practicability of the optimization results is more important than optimality in mathematics, particularly for flow- or head-sensitive cascaded hydropower plants. Practical needs and experiences are very important to make executable generation schedules. By contrast, it is difficult to quantify complex abstract requirements through mathematical modeling method. Many constraints and conditions often make the optimization results and calculation efficiency hard to satisfy the practical engineering. Therefore, it is especially important to find a quick and practical method for short-term generation scheduling.

To solve the above problems, the invention proposes a method for short-term generation scheduling of cascade hydropower plants coupling cluster analysis and decision tree. It takes advantage of one reservoir and two hydropower plants named Tianshengqiao on the mainstream of Hongshui River to test the proposed method. Results show that the present invention can quickly obtain generation schedules of cascade hydropower plants according to generation boundary conditions. Compared with actual generations, the accuracy is more than 90%, showing good practicability.

SUMMARY

The invention aims to solve the generation scheduling of head- or flow-sensitive cascaded hydropower plants with "one reservoir and multiple plants" and the practicability of optimization results. This invention can establish decision-making library for generation scheduling from lots of historical operation data using knowledge rule technology. Thus, operation conditions for generation scheduling can be used to quickly determine proper generation profiles of hydropower plants. The practicability of optimization results can be improved.

The Technical Solution of the Invention

A method for short-term generation scheduling of cascade hydropower plants coupling cluster analysis and decision tree mainly consists of four main parts: establishing matching relationship of energy production between cascade hydropower plants, clustering typical generation curves of hydropower plants, making generation scheme based on decision tree, and making local correction for satisfying operation constraints. Following steps are given to implement a whole process of short-term generation scheduling of cascaded hydropower plants.

step 1.1 Establish matching relationship of energy production between cascade hydropower plants: based on historical generation data of cascade hydropower plants, correlation analysis method is used to determine the matching relationship of energy production between upstream and downstream hydropower plants, including the following two steps:

step 1.1(a) Determine impact factors related to energy production of upstream hydropower plant: when the upstream hydropower plant has a yearly or higher regulating storage capacity, daily inflow and tailrace water level have a small effect on daily energy production. The daily energy production is mainly related to reservoir level and power discharge, so regression analysis method is used to determine a relationship between the daily energy production and reservoir level and power flow discharge as shown in Eq. (1);

$$E_i = f(Zup_i, \bar{q}_i) \quad (1)$$

Where $E_i$ is daily energy production of hydropower plant i; f represents a functional relationship of daily energy production, reservoir level and power discharge; $\bar{Z}up_i$ is reservoir level of hydropower plant i; $\bar{q}_i$ is average daily power discharge of hydropower plant i;

step 1.1(b) Determine the matching relationship of energy production between upstream and downstream hydropower plants: for hydraulic-sensitive cascade hydropower plants, local inflow is ignored because upstream and downstream plants are close and local inflow is usually very small; Reservoir level and outflow of upstream hydropower plant are main factors affecting energy production of downstream hydropower plant, as shown in Eq. (2):

$$E_{i+1} = f(Zup_{i+1}, \bar{q}_i) = f(Zup_{i+1}, Zup_i, E_i) \quad (2)$$

where $E_{i+1}$ is daily energy production of hydropower plant i+1; $Zup_{i+1}$ is reservoir level of hydropower plant i+1;

step 1.2 Cluster typical generation curves of hydropower plants: cluster analysis is conducted on historical generation data to determine typical generation curves of each hydropower plant, including the following two steps:

step 1.2(a) Develop cluster vector: load rate in a single period is used to determine eigenvector R, so as to fully reflect changes of generation within one day, which is represented as Eqs. (3) and (4):

$$R_t = N_t/N_{max} \quad (3)$$

$$R = (R_1, R_2, \ldots R_n) \quad (4)$$

where $R_t$ is eigenvector vector of generation curve in period t; $N_t$ is power value of generation curve in period t; $N_{max}$ is maximum generation of hydropower plant within one day.

step 1.2(b) Cluster typical generation curve: based on cluster vector obtained in step (a), classical k average algorithm is used to cluster the generation curve. First, transform historical daily 24-point generation curve using the step (a), and obtain cluster samples; Second, randomly choose k samples of generation curves and let each sample stand for initial average or center of a cluster; remaining samples of generation curve are assigned to the most similar cluster according to respective distance to each cluster center; Thus, new center of each cluster is recalculated; An iteration is required until a square error criterion function shown in formula (5) converges;

$$V = \sum_{l=1}^{k} \sum_{x_j \in S_l} (x_j - \mu_l)^2 \quad (5)$$

where V is sum of square errors of all generation curve samples in historical data set; $x_j$ is generation curve sample of a group of cluster vectors; $\mu_l$ represents a cluster vector, which is center of cluster $S_l$;

step 1.3 Make generation scheme based on decision tree: based on cluster typical generation curve obtained in step 1.2, decision tree method is used to train main impact factors of generation scheduling and operation decision to establish a relationship between these main impact factors and generation curves and quickly determine the power generation profile of cascade hydropower plants; Two parts are included: determine impact factors of power generation and establish decision tree of generation scheduling.

step 1.3(a) Determine impact factors of power generation: for each upstream hydropower plant, three main factors are considered, including initial reservoir level, daily energy production and load characteristics during time horizon, as shown in Eq. (6); For a downstream hydropower plant, in addition to the three factors of this plant, the daily energy production and type of generation curves of the upstream hydropower plant are, as shown in Eq. (7).

$$Type_i = f(Zup_i, E_i, Date) \quad (6)$$

$$Type_{i+1} = f(Zup_{i+1}, E_{i+1}, Date, E_i, Type_i) \quad (7)$$

where $Type_i$, $Type_{i+1}$ are types of generation curve of upstream hydropower plant and downstream hydropower plant, respectively; Date is scheduling date; $E_i$ is daily energy production of hydropower plant i; $E_{i+1}$ is daily energy production of hydropower plant i+1 step 1.3(b) Establish decision tree of generation scheduling: Take generation curve number as a category attribute, and make other related factors including energy production, water level and scheduling date as non-category attributes; Utilize a decision tree algorithm called C4.5 to develop a decision tree of generation scheduling of hydropower plants.

step 1.4 Make local correction for satisfying operation constraints: the step 1.2 and 1.3 can determine a generation scheme of cascade hydropower plants; however, when differences in reservoir level, electricity and inflow, violation of operation constraints in one or more periods, adjust generation scheme according to generation climb constraint and upper and lower limitation of power generation while the daily energy production of hydropower plant is controlled;

The invention can achieve significant effects. The present invention originates from practical requirements and employs knowledge rule techniques. A method for short-term generation scheduling of cascade hydropower plants coupling cluster analysis and decision tree is developed. Linear regression technique is adopted to determine a matching relationship of energy production between upstream and downstream hydropower plants. With the relationship, typical generation curves of each hydropower plant can be clustered from lots of historical data. These typical generation curves and impact factors of generation scheduling such as planned daily electricity, reservoir level, and power grid characteristics, are together trained to obtain decision-making library for generation scheduling of cascaded hydropower plants. Thus, the decision tree method can be used to rapidly determine an operational scheme for generation scheduling of cascaded hydropower plants. Finally, a correction strategy for operation constraints is introduced to ensure feasibility of the operation scheme. Compared to conventional mathematical models or optimization algorithms for cascaded hydropower system operations, the invention can quickly obtain generation schedules of cascade hydropower plants according to generation boundary conditions. It is effective to solve the poor practicability of operation results and inconsistence with production habits, providing a novel technical way for short-term generation scheduling of cascade hydropower plants with one reservoir.

DESCRIPTION OF DRAWINGS

FIG. 8 (a) is generation profile of the first reservoir of Tianshengqiao cascaded hydropower plants in dry season;

FIG. 8 (b) is generation profile of the second plant of Tianshengqiao cascaded hydropower plants in dry season;

FIG. 9 (a) is generation profile of the first reservoir of Tianshengqiao cascaded hydropower plants in flood season;

FIG. 9 (b) is generation profile of the second plant of Tianshengqiao cascaded hydropower plants in flood season.

DETAILED DESCRIPTION

The specific embodiments of the present invention are further described below in conjunction with the drawings and technical solutions.

Short-term operations of cascaded hydropower plants aim to determine day-ahead generation schedules of each hydropower plant. Hydropower plants usually undertake important tasks such as power supply, peak shaving and frequency regulation in power grid operations, so specific working position of a hydropower plant generally varies with demands of power grid in daily actual operations, thus leading to different selection of objectives. The purpose of the invention is to propose a common and practical method for short-term operations of cascaded hydropower plants. Therefore, none of a specific optimization objective is introduced. Actual demands of power grid, control conditions of power plants and various operation constraints are considered to make generation schedules of short-term operations. Main constraints are given as follows.

1) Water Balance $$v_{i,t} = v_{i,t+1} + (Q_{i,t} + I_{i,t} - u_{i,t}) \times \Delta t \times 3600 \quad (8)$$

where $v_{i,t}$ is storage capacity of reservoir i at the end of period t, m³; $Q_{i,t}$ is inflow into reservoir i in period t, which is directly discharged from upstream reservoirs, m³/s; $I_{i,t}$ is local inflow of reservoir i in period t, m³/s; $u_{i,t}$ is outflow from reservoir i in time period t, m³/s; $u_{i,t} = q_{i,t} + s_{i,t}$; $q_{i,t}$ is power discharge of hydropower plant i in period t, m³/s; $s_{i,t}$ is spilled discharge of hydropower plant i in period t, m³/s; $\Delta t$ is time duration in each period, h.

2) Limits of Reservoir Level $$\underline{Z}_i \le z_{i,t} \le \overline{Z}_i \quad (9)$$

where $\overline{Z}_i$, $\underline{Z}_i$ are upper and lower limits of water level of reservoir i; $z_{i,t}$ is reservoir level of reservoir i at the end of period t, m.

3) Limits of Power Discharge $$\underline{Q}_i \le q_{i,t} \le \overline{Q}_i \quad (10)$$

where $\overline{Q}_i$; $\underline{Q}_i$ are upper and lower limits of power discharge of hydropower plant i, m³/s.

4) Limits of Spilled Discharge $$s_{i,t} \le \overline{S}_i \quad (11)$$

where $\overline{S}_i$ is upper limit of spilled discharge of reservoir i, m³/s.

5) Limits of Total Discharge $$\underline{U}_i \le u_{i,t} \le \overline{U}_i \quad (12)$$

where $\overline{U}_i$, $\underline{U}_i$ are upper and lower limits of total discharge of reservoir i, m³/s.

6) Limits of Power Generation $$\underline{P}_i \le p_{i,t} \le \overline{P}_i \quad (13)$$

7) Generation Climb Constraint $$|p_{i,t} - p_{i,t-1}| \le \overline{\Delta P}_i \quad (14)$$

where $\overline{\Delta P}_i$ is maximum generation increase and decrease limit in a single period of hydropower plant i, MW.

8) Daily Energy Production Control Constraint $$\sum_{t=1}^{T} p_{i,t} \times \Delta t = E_i \quad (15)$$

Where T is total number of operational periods; $E_i$ is specified daily energy production of hydropower plant i.

9) Restricted Zones Constraint $$(p_{i,t} - \overline{p}_{i,t}^o)(p_{i,t} - \underline{p}_{i,t}^o) > 0 \quad \forall i, \forall t, \forall o \quad (16)$$

where $\overline{p}_{i,t}^o$, $\underline{p}_{i,t}^o$ are upper and lower limit of the oth restricted zone of hydropower plant i in time period t, MW.

Figure 1:
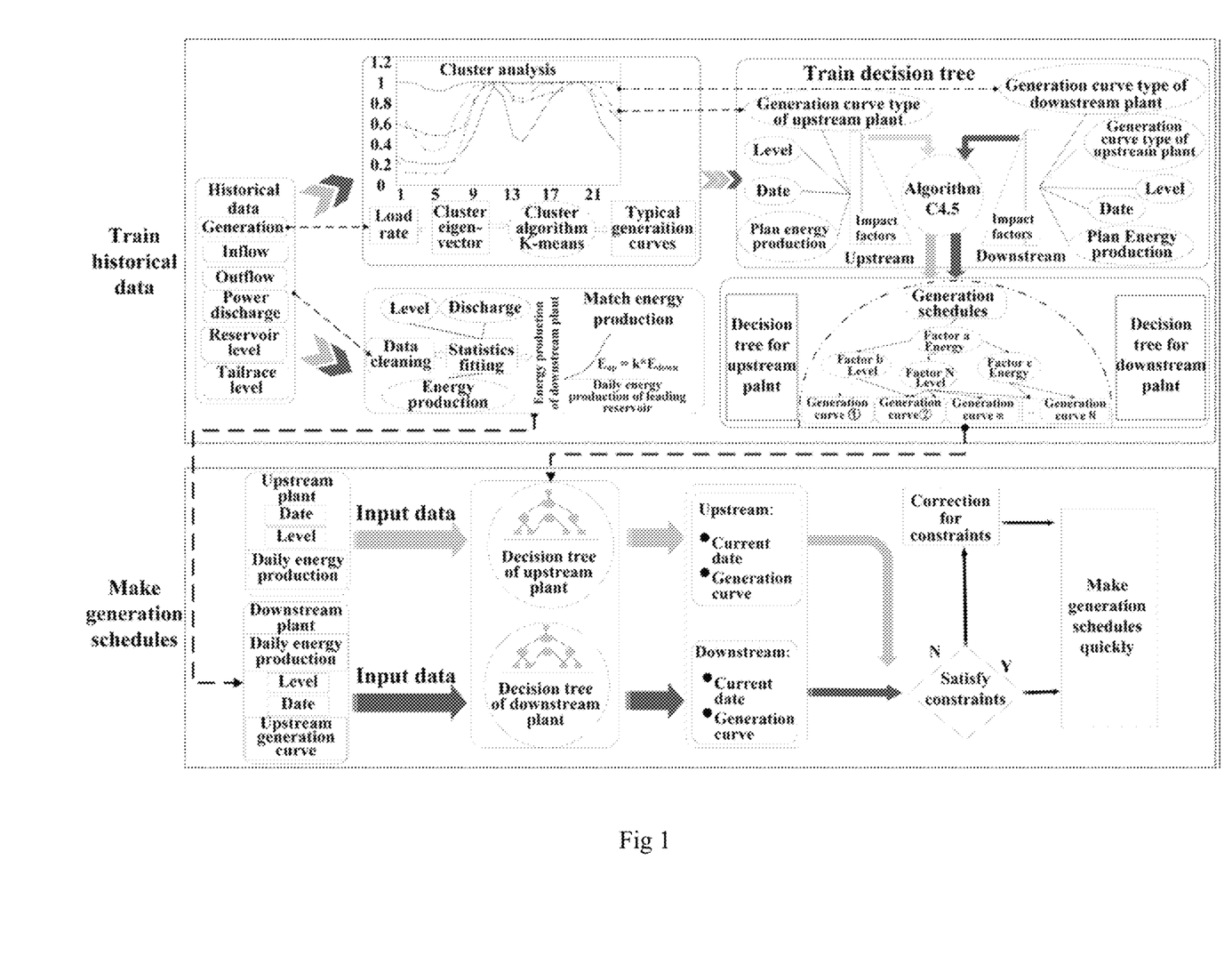
FIG. 1 is a schematic diagram of the method in the invention.

With the above constraints, the invention implements short-term generation scheduling of cascaded hydropower plants from the following four aspects according to main idea in FIG. 1.

(1) Establish Matching Relationship of Energy Production Between Cascade Hydropower Plants The daily energy production of a hydropower plant is an important control index of power grid operations and an important basis for scheduling daily generation schedules in actual operations. For flow- or head-sensitive cascaded hydropower plants, how to determine the energy production of downstream hydropower plant is extremely important. The key problem is to establish a matching relationship between daily energy productions of upstream and downstream hydropower plants, so as to ensure rationality and accuracy of generation schedules.

From the point of hydraulic connection, matching energy production essentially means matching power discharge. Traditional NHQ method can be used to accurately calculate power discharge and energy production, and then obtain matching relationship of energy productions of cascaded hydropower plants. However, cascaded hydropower plants with "one-reservoir and multiple plants" face two problems: (1) most of downstream plants are characterized as diversion type and high water head; complex diversion way makes head loss difficult to calculate exactly, and then causes inaccuracy of water head, which leads to a large error of power discharge calculated by NHQ; (2) an iterative calculation is required in actual operations, which is more complex.

Based on historical generation data of cascade hydropower plants, key factors can be selected from impact factors related to matching energy productions between upstream and downstream plants. Regression equation is adopted to determine the matching relationship of energy production between upstream and downstream hydropower plants so that head loss caused by calculation errors is avoided. Thus, application in actual operations is also simplified. The method for matching energy productions consists of two parts. 1) Impact factors related to energy productions of upstream and downstream hydropower plants are determined, respectively; daily energy production is usually related to inflow, power discharge, reservoir level, and tailrace water level, shown in Eq. (17); A specific related equation is dependent on generating characteristics of a hydropower plant; Main impact factors need to be determined according to lots of historical data;

$$E_i = f(Zup_i, I_{i,t}, \bar{q}_i, Zdown_i) \quad (17)$$

where $E_i$ is daily energy production of hydropower plant i; $Zup_i$ is reservoir level of hydropower plant i; $\bar{q}_i$ is average daily power discharge of hydropower plant i; $Zdown_i$ is tailrace water level of hydropower plant i.

Generally, the upstream hydropower plant has a yearly or higher regulating storage capacity, daily inflow and tailrace water level have a small effect on daily energy production. Therefore, the Eq. (17) for regression analysis can be simplified.

$$E_i = f(Zup_i, \bar{q}_i) \quad (18)$$

For a downstream hydropower plant with daily regulation, reservoir level and outflow of upstream hydropower plant are main factors affecting energy production, simplified as $$E_{i+1} = f(Zup_{i+1}, \bar{q}_i) = f(Zup_{i+1}, Zup_i, E_i) \quad (19)$$

(2) Cluster Typical Generation Curves of Hydropower Plants 2.1 Develop Cluster Vector Before clustering generation curves of hydropower plant, change characteristics of generation curves need to be represented. In this invention, load rate in a single period is adopted to form eigenvector, so as to fully reflect changes of generation within one day, which is represented as follows.

$$R_t = N_t/N_{max} \quad (20)$$

$$R = (R_1, R_2, \ldots R_n) \quad (21)$$

2.2 Cluster Method

Based on cluster vector obtained in last step, classical k average algorithm is used to cluster the generation curve. Basic principle of this method is to divide n object sets into k clusters so that elements in a cluster have high similarity while elements in different clusters have low similarity. Here, the similarity of a cluster is used to evaluate average of all elements, seen as mass or gravity center of a cluster.

The above method is used to cluster generation curves. First, transform historical daily 24-point generation curve using the step ①, and obtain cluster samples; Second, randomly choose k samples of generation curves and let each sample stand for initial average or center of a cluster; Rest samples of generation curve are assigned to the most similar cluster according to its distance to each cluster center; Thus, new center of each cluster can be recalculated; An iteration is required until a square error criterion function shown in following equation converges;

$$V = \sum_{l=1}^{k} \sum_{x_j \in S_l} (x_j - \mu_l)^2 \quad (22)$$

A detail procedure for cluster method is given as follow.

Step 2.2.1. Select any k groups from n groups of generation curve samples as initial clustering center;

Step 2.2.2. Calculate the distance between each group of output curve samples and the cluster center samples according to average value of each cluster object; Reclassify corresponding objects according to the minimum distance.

Step 2.2.3. Recalculate the average value of each cluster;

Step 2.2.4. Calculate standard measure function. If convergence condition is satisfied, the procedure will finish; otherwise, go back to Step 2.2.2.

Figure 2:
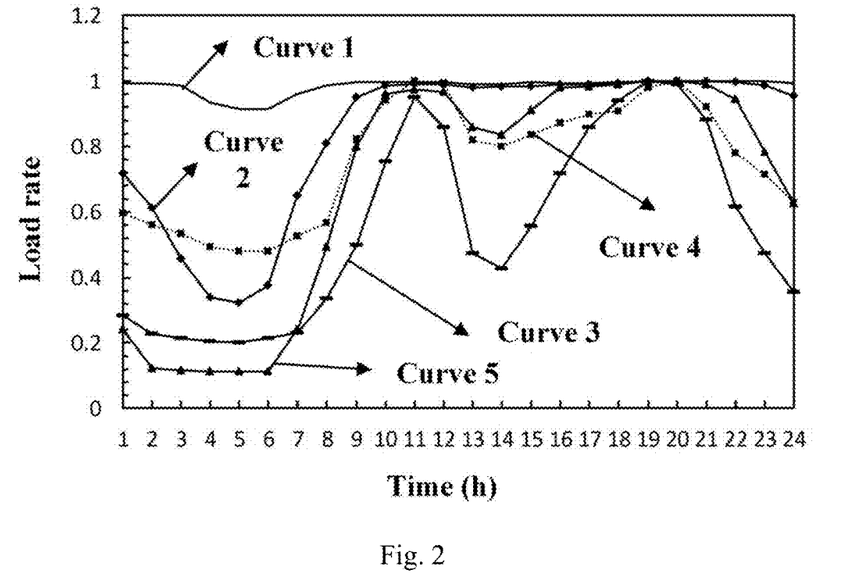
FIG. 2 is a schematic diagram of clustered typical generation curves.

Using the above steps, the clustering results of typical generation curves of a hydropower plant can be obtained to develop a decision library of generation scheduling. FIG. 2 shows an example of clustering generation curves of a hydropower plant.

(3) Make Generation Scheme Based on Decision Tree

Based on cluster typical generation curve, decision tree method is used to train main impact factors of generation scheduling and operation decision to establish a relationship between these factors and generation curves and quickly determine the power generation profile of cascade hydropower plants; two parts are included: determine impact factors of power generation and establish decision tree of generation scheduling.

3.1 Determine Impact Factors of Power Generation

For an upstream hydropower plant, three main factors are considered, including initial reservoir level, daily energy production and load characteristics during time horizon. Among them, reservoir level mainly affects water head and power discharge; daily energy production has an important impact on total released water; load characteristics are often related to season; Southern Power Grid usually faces peak load at time 11:00 in summer and at time 07:00 in winter, so the load characteristics are replaced as date in the invention. Main relation equation can be represented as $$Type_i = f(Zup_i, E_i, Date) \quad (23)$$

Where $Type_i$ is a type of generation curve of upstream hydropower plant.

For a downstream hydropower plant, in addition to the above three factors of this plant, the daily energy production and type of generation curves of the upstream hydropower plant should also be considered, which can be described as $$Type_{i+1} = f(Zup_{i+1}, E_{i+1}, Date, E_i, Type_i) \quad (24)$$

where $Type_{i+1}$ is a type of generation curve of downstream hydropower plant.

3.2 Establish Decision Tree of Generation Scheduling

Decision tree is a kind of tree structure similar to binary tree or multi-way tree. Each non-leaf node in the tree (including root node) corresponds to a test of a non-category attribute in the training sample set. Each branch of non-leaf node corresponds to a test result of the attribute, and each leaf node represents a class or class distribution. The invention adopts decision tree algorithm C4.5 to establish a decision tree of generation scheduling, which has high classification accuracy and high speed.

A decision tree algorithm is used to develop a decision tree of generation scheduling of hydropower plants by taking generation curve number as a category attribute and making other related factors including energy production, water level and scheduling date as non-category attributes.

For the upstream hydropower plant, specific steps are as follows.

Step 3.2.1. Determine sample set D. Form a whole sample with daily initial water level, energy production, schedule date, generation curve number.

Step 3.2.2. Calculate information expectation of samples. Take generation curve number as a category attribute, and count typical generation curves included in various types of generation curves; Calculate information expectation of samples using the following equation.

$$Info(D) = -\sum_{l=1}^{m} p_l \log_2(p_l) \quad (25)$$

where m is total number of generation curves; $p_l$ is a rate of samples with generation curve numbered as 1 to total samples.

Step 3.2.3. Calculate information gain rate of non-category attributes. Where non-category attribute A has v values; correspondingly, generation curves samples are divided into v categories; the information gain rate of each non-category attribute is then calculated using the following equation.

Sample information expectation of attribute A $$Info_A(D) = \sum_{j=1}^{v} \frac{|D_j|}{D} \times Info(D) \quad (26)$$

Information Gain of Attribute A $$Gain(A) = Info(D) - Info_A(D) \quad (27)$$

Information Gain Rate of Attribute A $$SplitInfo(A) = -\sum_{j=1}^{v} \frac{|D_j|}{|D|} \times \log_2\left(\frac{|D_j|}{|D|}\right) \quad (28)$$

$$GainRatio(A) = \frac{Gain(A)}{SplitInfo(A)}$$

where D is sample set; $D_j$ is number of sample of jth element included in attribute A.

Step 3.2.4. Select a split attribute node. For non-category attributes such as daily energy production, reservoir level, and scheduling date, the gain rate of sample information corresponding to each attribute is calculated using the method of Step 3.2.3; the non-category attribute with the largest gain rate is selected as a splitting node.

Step 3.2.5. Repeat Step 3.2.3 and Step 3.24 until sub-node number obtained by splitting is same with the previous node.

Figure 3:
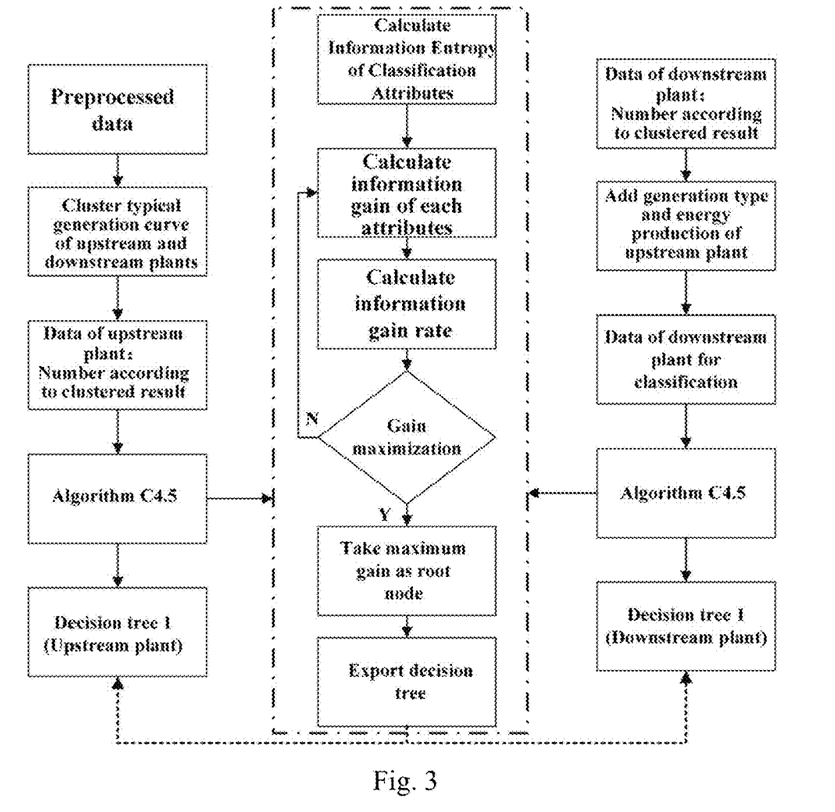
FIG. 3 is a schematic diagram of decision tree training principle for generation scheduling.
Figure 4:
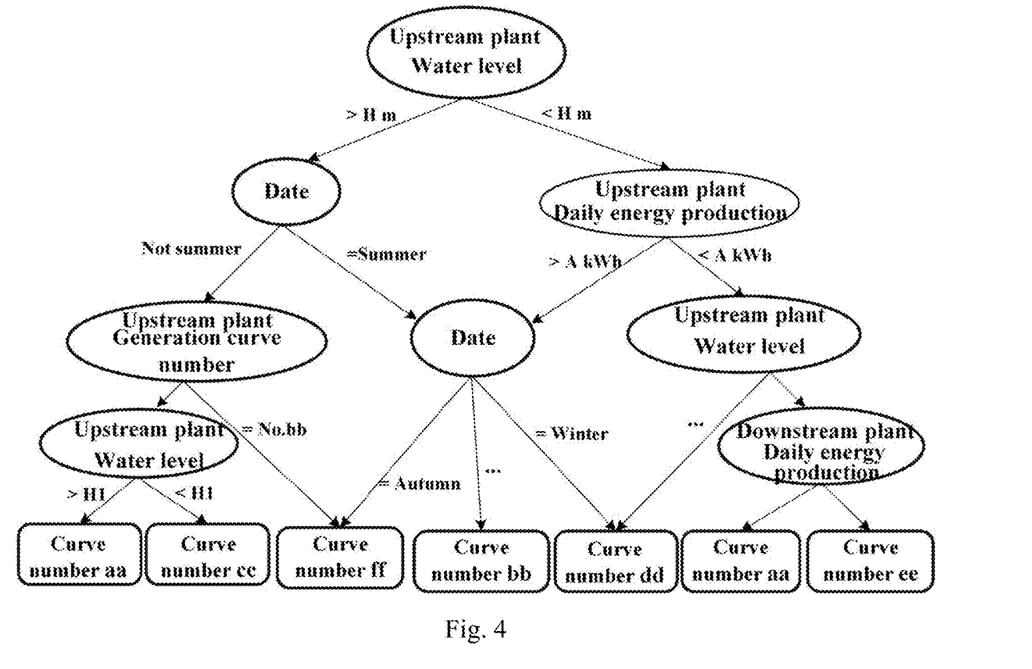
FIG. 4 is a schematic diagram of decision tree for generation scheduling.

For the downstream hydropower plant, the generation curve and daily energy production of upstream hydropower plant are added in the sample. The decision tree of generation scheduling of this plant can be established using the steps 3.2.1~3.2.5. FIG. 3 shows a schematic diagram of decision tree training principle for generation scheduling, and FIG. 4 depicts an application way of decision tree for generation scheduling.

(4) Make Local Correction for Satisfying Operation Constraints

The cluster analysis and decision tree methods can basically determine a generation scheme of cascade hydropower plants; however, because of differences in reservoir level, electricity and inflow demand difference, violation of operation constraints may occur in some periods, including generation climb constraint and upper and lower limitation of power generation; so it is necessary to slightly adjust generation scheme according to generation climb constraint and upper and lower limitation of power generation while the daily energy production of hydropower plant is controlled; thus, feasibility of generation scheme can be ensured.

4.1 Correction Strategy for Generation Climb Constraint

When the generation climb constraint is violated, adjust generations at adjacent periods and keep total energy production at these periods unchanged. Wherein the correction strategy steps are as follows:

Step 4.1.1. Initial search is initiated from t=1 so that whether the climb constraint is violated at each period is determined.

Step 4.1.2. If $|N_{t+1}-N_t|>\overline{\Delta p}$, then start to search reverse change of generation climb from t+1 to t=1, and denote the searched period as j; Thus, [j+1,t+1] is a period interval for continuous generation climb, whose length is defined as L; When L=1, there is only a violation between two adjacent periods;

Step 4.1.3. Set generation difference between adjacent periods equal to upper limit of generation climb constraint, and thus determine generation increment at related periods with $\Delta N=\max\{(|N^{t+1}-N^t|-\overline{\Delta p})/(L+1), 0\}$; Adjust generation at related periods using Eq. (29);

$$N_{1+t-n} = \begin{cases} N_{t+1-n} + \Delta N, & (N_{t+1} - N_t > 0) \\ N_{t+1-n} - \Delta N, & (N_{t+1} - N_t \le 0) \end{cases}, n = \{0, 1, 2 \ldots L\} \quad (29)$$

Step 4.1.4. Search backwards from t=1 until ending period of time horizon. If violation of generation climb constraints occurs at a period, then repeat the above steps until generation climb constraints at all periods are satisfied.

4.2 Correction Strategy for Generation Limitation

When operation generation profile does not meet the presented requirements, adjust the generation profile by controlling daily energy production. Specific steps are as follows:

Step 4.2.1. Determine combined restricted zones of hydropower plant: Obtain the restricted zone O of each unit under current water head, and determine restricted zones of different unit combinations using set operation theory;

Step 4.2.2. Correction strategy for the violation of restricted zone constraint: Take Eq. (16) as correction criterion and check generation schedules at each period; If the generation at a period falls into a restricted zone, then Eq. (30) is used to adjust the generation;

$$p_{i,t} = \begin{cases} \overline{p}^s_{i,t,k}, & p^s_{i,t,k} \leq p'_{i,t} \leq \overline{p}^s_{i,t,k} \\ \underline{p}^s_{i,t,k}, & \underline{p}^s_{i,t,k} < p'_{i,t} \leq p^s_{i,t,k} \end{cases} \quad (30)$$

$$p^s_{i,t,k} = \frac{\overline{p}^s_{i,t,k} + \underline{p}^s_{i,t,k}}{2} \quad (31)$$

where $p_{i,t}$ is corrected generation of plant i at period t; $p'_{i,t}$ is generation of plant i at period t, which falls into a restricted zone; $p^s_{i,t,k}$ is average generation of the kth restricted zone of plant i at period t;

Step 4.2.3. Correction strategy for ideal generation point: If a hydropower plant has ideal generation constraints due to security requirements of power grid or operation efficiency, further adjust scheduled generation in order to approach the ideal generation point; Define $N_{j1}^\%$ and $N_{j2}^\%$ as any two adjacent values in ideal generation point set A, and adjust the scheduled generation $N_t$ from t=1 to t=T, where A is ideal generation point set; Check all elements of set A, make $N_{j1}\% \leq N_t \leq N_{j2}^\%$ and adjust $N_t$ using Eq. (32);

$$N'_t = \begin{cases} N_{j1}^\%, & N_t < \frac{N_{j1}^\% + N_{j2}^\%}{2} \\ N_{j2}^\%, & N_t \geq \frac{N_{j1}^\% + N_{j2}^\%}{2} \end{cases} \quad (32)$$

Step 4.2.4. Correction strategy for energy production: When the daily energy production of a hydropower plant after generation correction does not meet the given control condition, it (the daily energy production of a hydropower plant) needs to be revised using following steps; Time intervals of peak load, waist load and valley load are determined according to load variation trend of receiving power grid, which are denoted as P, M, S, respectively; $E_0$, $E_1$ are defined as the given energy production and the corrected energy production, respectively; $\delta_E$ is defined as scale of energy production; $|\Delta E| < |\delta_E|$ are taken as convergence criterion, where $\Delta E = E_1 - E_0$; When $\Delta E > 0$, generations is adjusted to adjacent smaller ideal value in order of valley load, waist load and peak load until $|\Delta E| < |\delta_E|$ is satisfied; when $\Delta E < 0$, generations are adjusted to adjacent larger ideal value in order of peak load, waist load and valley load until the convergence criterion is satisfied;

When $\Delta E > 0$, specific steps are given as follows:

Step 4.2.4(a) Adjust generation at the ith point in the set S using Eq. (33);

$$N_i' = N_{j1}^\%, (t_i \in S, 1 \leq i \leq n) \quad (33)$$

where $N_{j1}^\%$ is lower boundary of ideal interval of $N_t$; n is total number of points included in set S;

Step 4.2.4(b) Calculate $\Delta E$; If $\Delta E > 0$, then go back to step 4.2.4(a) and adjust $N_{i+1}$; Implement iteratively Step 4.2.4(a) the previous process for other points in set S; If $\Delta E < 0$ at point k, then go to step 4.2.4(c); After all points in set S are adjusted, if $\Delta E > 0$ and $|\Delta E| > |\delta_E|$, then go back to step 4.2.4(a) and continue to adjust other points in set M and P;

Step 4.2.4(c) Because of sign change of DE at point k, adjusting interval of $N_k$ can be represented as $$C = \left[ \frac{\Delta E - |\delta|}{\Delta t} + N_{j1}^\%, \frac{\Delta E + |\delta|}{\Delta t} + N_{j1}^\% \right];$$

With the consideration of restricted zone O, Eq. (34) is obtained;

$$N_k \in H_t = C - C \cap O \quad (34)$$

If $H \neq \emptyset$, then $N_{tk}' = \overline{h}$, where h is upper boundary of set H; If $H = \emptyset$, then $N_{tk}' = \overline{c}$, where $$\overline{c} = \frac{\Delta E - |\delta|}{\Delta t} + N_{j1}^\%;$$

In this situation, generation at point k falls into a restricted zone, the method in the above 4.2 is used to adjust the generation, and then procedure is returned back to step 4.2.4(b) for adjusting point k+1;

Step 4.2.4(d) When $|\Delta E| < |\delta_E|$, step 4.2.4 will stop.

With the above idea, a complete application of short-term operations of cascaded hydropower plants is carried out in accordance with the following steps (1)-(7).

Step 1. Determine impact factors related to energy production of upstream hydropower plant. when the upstream hydropower plant has a yearly or higher regulating storage capacity, daily inflow and tailrace water level have a small effect on daily energy production. The daily energy production is mainly related to reservoir level and power discharge;

Step 2. Determine a matching relationship of energy production between upstream and downstream hydropower plants. for hydraulic-sensitive cascade hydropower plants, local inflow is ignored because upstream and downstream plants are close and local inflow is usually very small; Reservoir level and outflow of upstream hydropower plant are main factors affecting energy production of downstream hydropower plant;

Step 3. Develop cluster vector. Load rate $R_i = N_i/N_{max}$ in a single period is adopted to form eigenvector $R = (R_1, R_2, \ldots R_n)$, so as to fully reflect changes of generation within one day;

Step 4. Cluster typical generation curve. Based on cluster vector obtained in above step, classical k average algorithm is used to cluster the generation curve. First, transform historical daily 24-point generation curve using the step (3), and obtain cluster samples; Second, randomly choose k samples of generation curves and let each sample stand for initial average or center of a cluster; Rest samples of generation curve are assigned to the most similar cluster according to its distance to each cluster center; Thus, new center of each cluster can be recalculated; An iteration is required until a square error criterion function shown converges;

Step 5. Determine impact factors of power generation: for an upstream hydropower plant, three main factors are considered, including initial reservoir level, daily energy production and load characteristics during time horizon; For a downstream hydropower plant, in addition to the above three factors of this plant, the daily energy production and type of generation curves of the upstream hydropower plant should also be considered;

Step 6. Establish decision tree of generation scheduling: based on the typical clustered generation curves, utilize a decision tree algorithm called C4.5 to make a classification training of power generation impact factors and dispatching decision process; take generation curve number as a category attribute, and make other related factors including energy production, water level and scheduling date as non-category attributes; develop a relationship between generation scheduling of hydropower plants in order to quickly determine generation profile of cascaded hydropower plants.

Step 7. Make local correction for satisfying operation constraints. Adjust generation scheme slightly according to generation climb constraint and upper and lower limitation of power generation while the daily energy production of hydropower plant is controlled; thus, feasibility of generation scheme can be ensured.

Short-term operations of Tianshengqiao cascaded hydropower plants on the mainstream of Hongshui River is taken as an example to verify the method in the invention. Tianshengqiao is a typical head- and flow-sensitive cascades hydropower plans. Installed capacity of the first reservoir of Tianshengqiao is about 674 times to that of the second plant. The downstream plant is extremely sensitive to outflow of the upstream reservoir. Maximum water heads of two hydropower plants are more than 100 m and 200 m, respectively. There are restricted operation zones varying with water head, which increases difficulty for generation scheduling and actual operations of cascaded hydropower plants. In the following part, the method of the invention is used to determine matching relationship of energy productions between Tianshengqiao cascaded hydropower plants and generation scheduling process based on decision tree. Simulation results are analyzed in detail.

Figure 5:
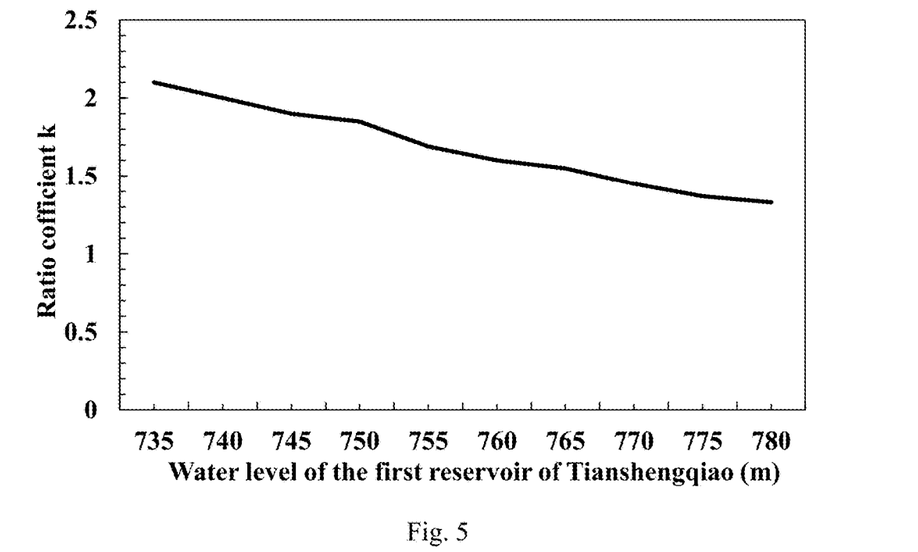
FIG. 5 is a schematic diagram of daily generation coefficient ratio of cascaded hydropower plants.
Figure 6:
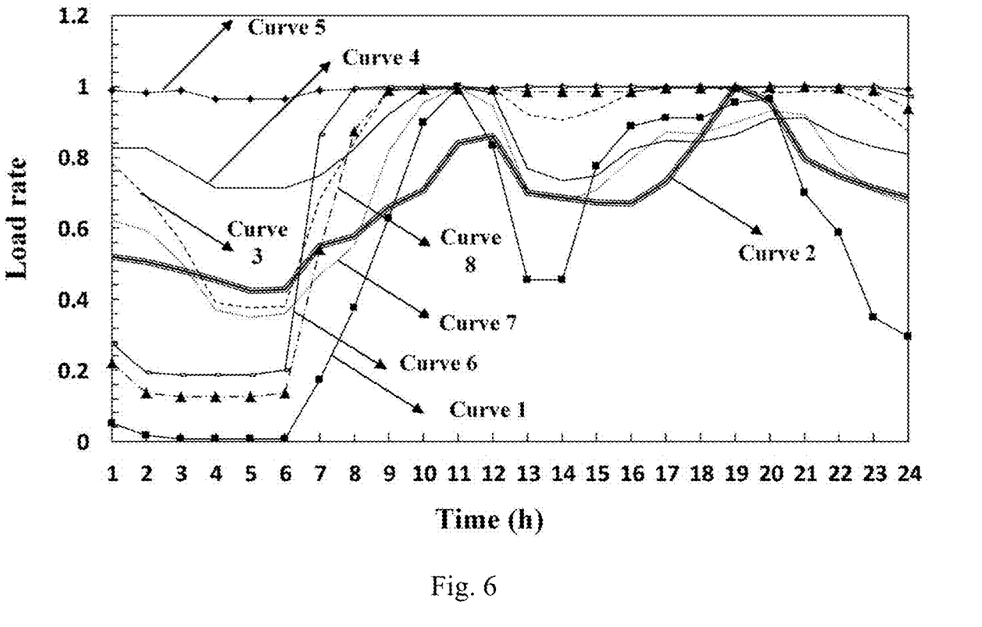
FIG. 6 is typical generation curves of the first reservoir of Tianshengqiao cascaded hydropower plants.
Figure 7:
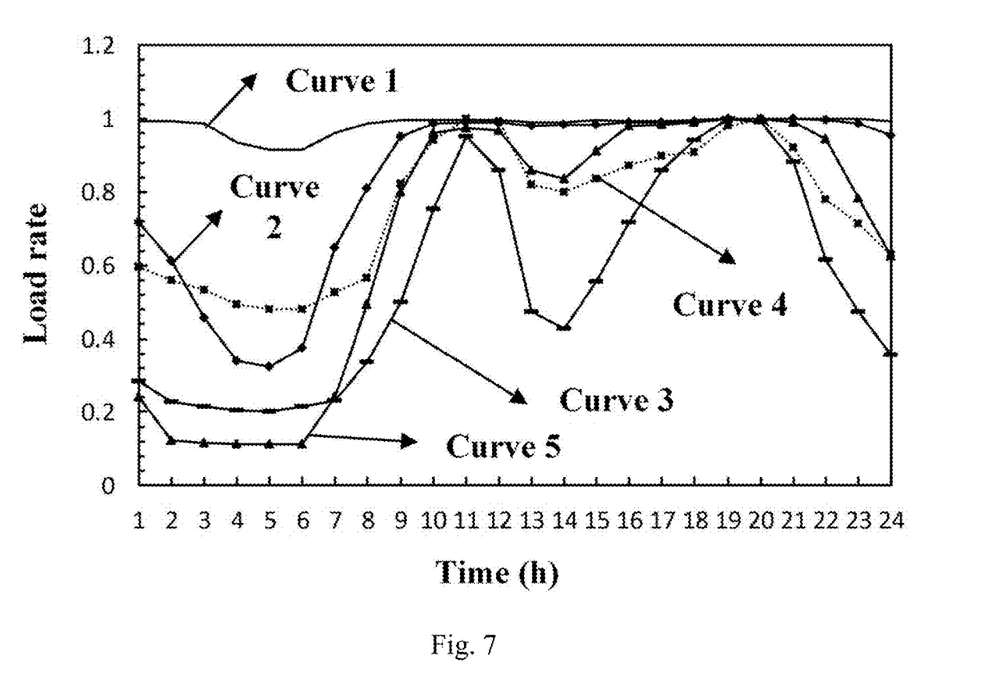
FIG. 7 is typical generation curves of the second plant of Tianshengqiao cascaded hydropower plants.

The matching relations of energy production between cascaded hydropower plants are developed by the above method. Eq. (35) is a relationship between power discharge and reservoir level and energy production of the first reservoir of Tianshengqiao; Eq. (36) is a relationship between power discharge and energy production of the second plant of Tianshengqiao; Eq. (37) is a matching relation between the two hydropower plants; k is daily generating coefficient ratio, determined in FIG. 5. According to the above clustering method of generation curve, typical generation curves of the first and the second hydropower plants of Tianshengqiao are obtained, respectively shown in FIG. 6 and FIG. 7.

$$q_1 = (4.159 \times 10^{-5} \overline{Z}_{up1}^2 - 6.672814 \times 10^{-2} \overline{Z}_{up1} + 27.08459) E_1 \tag{35}$$

$$q_2 = 0.252423 E_2 \tag{36}$$

$$E_2 = k E_1 \tag{37}$$

The typical generation curve numbers are taken as classification attributes, and are trained using the algorithm C4.5 to construct the decision tree of generation scheduling. The test results show that accuracy of operation results for the first reservoir of Tianshengqiao reaches 91.11%, and the accuracy of the second plant of Tianshengqiao is 88.03%. Both have high precision and can be used for generation scheduling.

Figure 8:
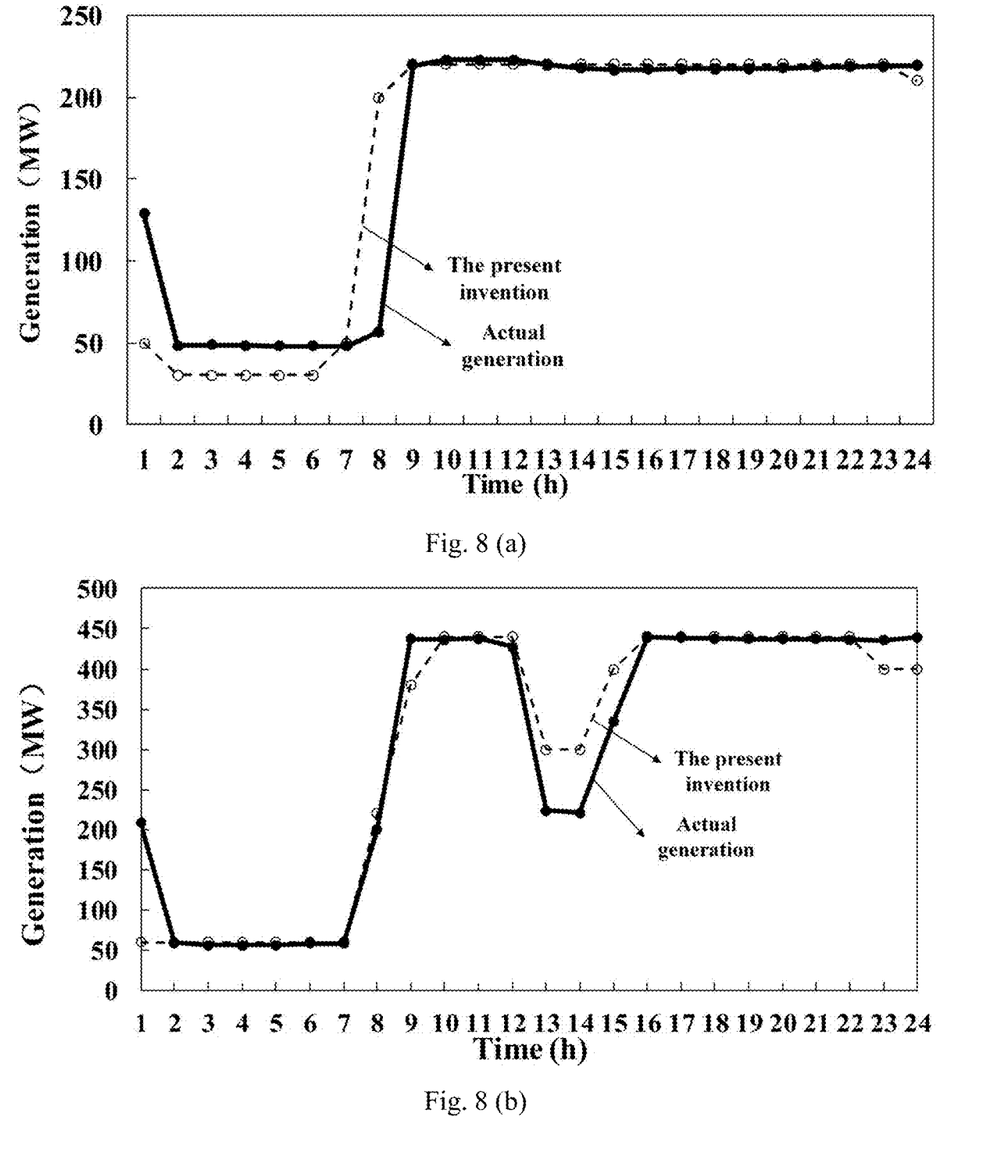
Figure 9:
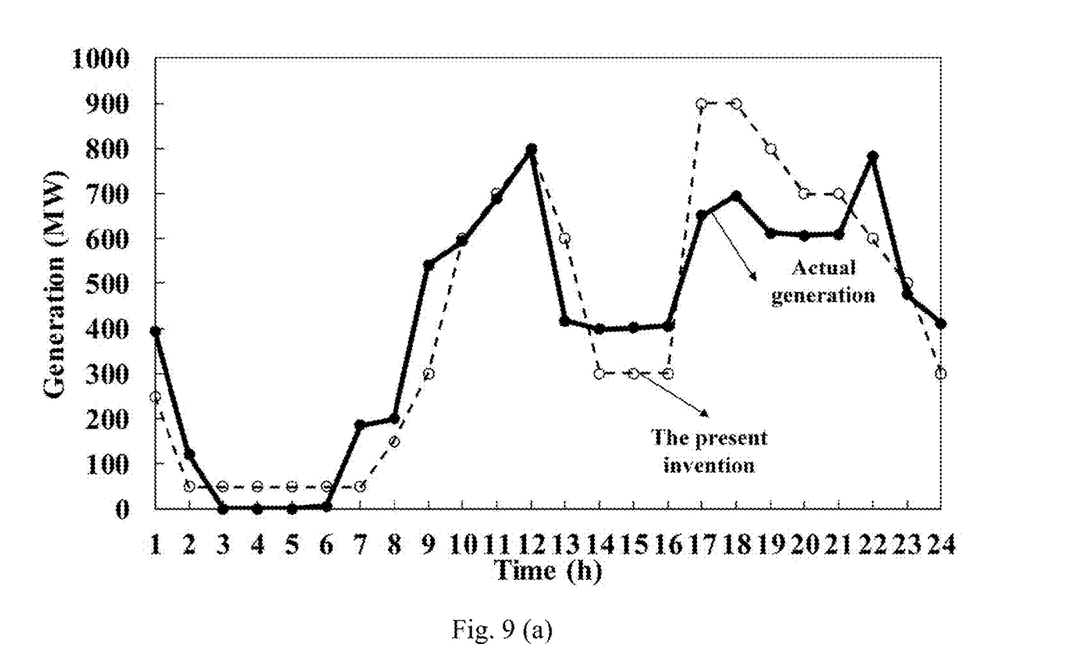

Actual data in flood season (July) and dry season (January) are selected for verification. FIG. 8 and FIG. 9 present optimized generation profiles and actual data in the two cases. In order to facilitate comparative analysis, four typical characteristic parameters, namely daily average load rate α, daily peak and valley differential rate β, peak load number γ and average base load value η (mean value of output in the trough period, 00:00~07:00), are introduced below. Similarity index is also constructed to represent the accuracy of generation schedules obtained by the method of the invention.

Daily Average Load Rate:

$$\alpha = \frac{P_{avg}}{P_{max}}$$

Daily Peak and Valley Differential Rate:

$$\beta = \frac{P_{max} - P_{min}}{P_{max}}$$

where $P_{avg}$, $P_{max}$, $P_{min}$ are daily average load, maximum load and minimum load, respectively. Based on the above four indicators, the similarity between planned generation and the actual data can be obtained:

$$S = 0.25 \sum_{\Omega = \alpha, \beta, \gamma, \eta} \left( 1 - \frac{|V_{\Omega,a} - V_{\Omega,p}|}{\max\{V_{\Omega,a}, V_{\Omega,p}\}} \right). \tag{38}$$

It can be seen from calculation conditions and results that there is a big difference between control conditions of energy production on two typical days during flood and dry season, which is closely related to actual demands of power grid. In these two typical cases, the method in the invention produces good operation results, where variation trends of planned and actual generation profiles are basically consistent. This is directly seen from FIG. 8 and FIG. 9. According to similarity indexes in Table 2, the similarity of generation schedules obtained by the method in the invention reaches up to 95.5% on typical days in dry period, which reflects a high accuracy of optimization results.

The four indexes on the two typical days in flood and dry season are further analyzed. (1) The accuracy of daily average load rate $S_\alpha$ is relatively high under two typical daily schemes. This indicates that the invention obtains accurate daily maximum generation of hydropower plant under the control of daily energy production. Especially in the dry period, the daily energy production and maximum generation of the first and second hydropower plant of Tianshengqiao are basically same as the actual data, with an accuracy of nearly 100%. (2) Average accuracy of peak number is 92%, which indicates that this method in the invention can accurately determine peaking periods and generations. For the first reservoir of Tianshengqiao, there is a slight difference in peak number between optimized generation profiles and actual generation profiles on typical days in dry period. The main reason is small energy production in dry season make it difficult to search proper a typical generation curve from available typical types. Clustering analysis usually can obtain common operation generation profiles, but is hard for some special cases. When determining the operation scheme, the most close typical generation curve is only found. Therefore, a difference between the generation profile that the invention obtains and the actual generation profile is caused. (3) The average accuracy of daily peak-valley differential rate $S_\beta$ reaches as high as 93.7%. This indicates that this method can accurately determine maximum and minimum generations. FIGS. 8 and 9 show the result. Especially, on the typical day in dry period, the maximum generation obtained by this method is identical to the actual data. There is only a small difference in the minimum generation of the first reservoir of Tianshengqiao. (4) The accuracy index $s_\eta$ of average baseload mainly reflect generation level of a hydropower plant in base-load hours. The accuracy of the typical days in dry period for the second hydropower plant of Tianshengqiao is relatively low. This is mainly due to overestimation of energy production of the first reservoir of Tianshengqiao during light load hours compared to the actual data. Thus, the energy production of the second hydropower of Tianshengqiao increases. The searched typical generation curve (the second in FIG. 7) is different from the actual one, which affects average value of base loads.

Based on the above analysis, the clustering technology and the decision tree method can produce feasible generation schedules by solving the short-term generation scheduling of head- or flow-sensitive cascaded hydropower plants. The accuracy is relatively high compared with the actual data, which reflects that the invention makes full use of historical operation data of hydropower plants. The importance of these data for daily generation scheduling is also demonstrated. On the other hand, from the perspective of relationship of upstream and downstream hydropower plants, matching of daily energy productions and generation profiles is extremely important, especially for the downstream hydropower plant. The calculation results from the invention also verify the accuracy of the matching relationship of energy productions and generation profiles between the first and second hydropower plants of Tianshengqiao.

TABLE 1

Basic parameters of hydropower plants

| Characteristic parameters | Hydropower plant | |
|---|---|---|
| | The first reservoir of Tianshengqiao | The second hydropower plant of Tianshengqiao |
| Normal water level (m) | 780.00 | 645.00 |
| Dead water level (m) | 731.00 | 637.00 |
| Maximum water head (m) | 143 | 204 |
| Regulating storage capacity ($10^8 m^3$) | 57.95 | 0.086 |
| Regulation ability | Multi-yearly | Daily |
| Installed capacity (MW) | 1200 | 1320 |

TABLE 2

Calculation results

| | | Date | |
|---|---|---|---|
| | | $2^{th}$ January | $7^{th}$ July |
| The first reservoir of Tianshengqiao | Reservoir level/m | 750.77 | 751.2 |
| | Daily energy production/10,000 kWh | 397 | 1000 |
| | Predicted generation curve number (see FIG. 6) | 6 | 1 |
| | Accuracy rate Average daily load $S_\alpha$ | 99.1% | 88.9% |
| | Number of peaks $S_\gamma$ | 100% | 66.7% |
| | Peak-valley difference rate $S_\beta$ | 91.3% | 94.1% |
| | Average of base load $S_\eta$ | 84.7% | 83.3% |
| | Synthetic similarity S | 93.8% | 83.2% |
| The second hydropower plant of Tianshengqiao | Reservoir level/m | 641.48 | 641.84 |
| | Daily energy production/10,000 kWh | 720 | 1792 |
| | Predicted generation curve number (see FIG. 7) | 5 | 2 |
| | Accuracy rate Average daily load $S_\alpha$ | 99.9% | 90.9% |
| | Number of peaks $S_\gamma$ | 100% | 100% |
| | Peak-valley difference rate $S_\beta$ | 98.5% | 91% |
| | Average of base load $S_\eta$ | 90.6% | 67.5% |
| | Synthetic similarity S | 97.1% | 87.4% |

The invention claimed is:

1. A method for short-term generation scheduling of cascade hydropower plants coupling cluster analysis and decision tree, wherein comprising the following steps:

Step 1.1 establish matching relationship of energy production between cascade hydropower plants: based on historical generation data of cascade hydropower plants, correlation analysis method is adopted to determine the matching relationship of energy production between upstream and downstream hydropower plants, including the following two steps:

Step 1.1(a) determine impact factors related to energy production of upstream hydropower plant: when the upstream hydropower plant has a yearly or higher regulating storage capacity, daily inflow and tailrace water level have a small effect on daily energy production; the daily energy production is mainly related to reservoir level and power discharge, so regression analysis method is used to determine a relationship between the daily energy production and reservoir level and power flow discharge as shown in Eq. (1);

$$E_i = f(\overline{Zup}_i, \overline{q}_i) \tag{1}$$

where $E_i$ is daily energy production of hydropower plant i; f represents a functional relationship of daily energy production, reservoir level and power discharge; $\overline{Zup}_i$ is reservoir level of hydropower plant i; $\overline{q}_i$ is average daily power discharge of hydropower plant i;

Step 1.1(b) determine the matching relationship of energy production between upstream and downstream hydropower plants: for hydraulic-sensitive cascade hydropower plants, local inflow is ignored because upstream and downstream plants are close and local inflow is usually very small; reservoir level and outflow of upstream hydropower plant are main factors affecting energy production of downstream hydropower plant, as shown in Eq. (2):

$$E_{i+1} = f(\overline{Zup}_{i+1}, \overline{q}_i) = f(\overline{Zup}_{i+1}, \overline{Zup}_i, E_i) \tag{2}$$

where $E_{i+1}$ is daily energy production of hydropower plant i+1; $\overline{Zup}_{i+1}$ is reservoir level of hydropower plant i+1;

Step 1.2 cluster typical generation curves of hydropower plants: cluster analysis is conducted on historical generation data to determine typical generation curves of each hydropower plant, including the following two steps:

Step 1.2(a) develop cluster vector: load rate in a single period is used to determine eigenvector R, so as to fully reflect changes of generation within one day, which is represented as Eqs. (3) and (4):

$$R_t = N_t / N_{max} \tag{3}$$

$$R = (R_1, R_2, \ldots R_n) \tag{4}$$

where $R_t$ is eigenvector vector of generation curve in period t; $N_t$ is power value of generation curve in period t; $N_{max}$ is maximum generation of hydropower plant within one day;

Step 1.2(b) cluster typical generation curve: based on cluster vector obtained in step 1.2 (a), classical k average algorithm is used to cluster the generation curve; first, transform historical daily 24-point generation curve using the step 1.2 (a), and obtain cluster samples; second, randomly choose k samples of generation curves and let each sample stand for initial average or center of a cluster; remaining samples of generation curve are assigned to the most similar cluster according to a respective distance to each cluster center; thus, new center of each cluster is recalculated; an iteration is required until a square error criterion function shown in formula (5) converges;

$$V = \sum_{l=1}^{k} \sum_{x_j \in S_l} (x_j - \mu_l)^2 \qquad (5)$$

where V is sum of square errors of all generation curve samples in historical data set; $x_j$ is generation curve sample of a group of cluster vectors; $\mu_l$ represents a cluster vector, which is center of cluster $S_j$;

Step 1.3 make generation scheme based on decision tree: based on cluster typical generation curve obtained in step 1.2, decision tree method is used to train main impact factors of generation scheduling and operation decision to establish a relationship between these main impact factors and generation curves and quickly determine the power generation profile of cascade hydropower plants; two parts are included: determine impact factors of power generation and establish decision tree of generation scheduling;

Step 1.3(a) determine impact factors of power generation: for each upstream hydropower plant, three main factors are considered, including initial reservoir level, daily energy production and load characteristics during time horizon, as shown in Eq. (6); for a downstream hydropower plant, in addition to the above three factors of this plant, the daily energy production and type of generation curves of the upstream hydropower plant are considered, as shown in Eq. (7);

$$\text{Type}_i = f(Zup_i, E_i, \text{Date}) \qquad (6)$$

$$\text{Type}_{i+1} = f(Zup_{i+1}, E_{i+1}, \text{Date}, E_i, \text{Type}_i) \qquad (7)$$

where $\text{Type}_i$, $\text{Type}_{i+1}$ are types of generation curve of upstream hydropower plant and downstream hydropower plant, respectively; Date is scheduling date; $E_i$ is daily energy production of hydropower plant $E_{i+1}$ is daily energy production of hydropower plant i+1;

Step 1.3(b) establish decision tree of generation scheduling: take generation curve number as a category attribute, and make other related factors including energy production, water level and scheduling date as non-category attributes; utilize a decision tree algorithm called C4.5 to develop a decision tree of generation scheduling of hydropower plants;

Step 1.4 make local correction for satisfying operation constraints: the step 1.2 and step 1.3 can determine a generation scheme of cascade hydropower plants; however, when differences in reservoir level, electricity and inflow demand difference, violation of operation constraints in one or more periods, adjust generation scheme according to generation climb constraint and upper and lower limitation of power generation while the daily energy production of hydropower plant is controlled.

2. The method for short-term generation scheduling of cascade hydropower plants coupling cluster analysis and decision tree according to claim 1, wherein, the steps for establishing decision tree of generation scheduling in step 1.3 are as follows:

for the upstream hydropower plant:

Step 2.1 determine sample set D: form a whole sample with daily initial water level, energy production, schedule date, generation curve number;

Step 2.2 calculate information expectation of samples: take generation curve number as a category attribute, and count typical generation curves included in various types of generation curves; calculate information expectation of samples using Eq. (8);

$$\text{Info}(D) = -\sum_{l=1}^{m} p_l \log_2(p_l) \qquad (8)$$

where m is total number of generation curves; $p_l$ is a rate of samples with generation curve numbered as l to total samples;

Step 2.3 calculate information gain rate of non-category attributes: wherein non-category attribute A has v values; correspondingly, generation curves samples are divided into v categories; the information gain rate of each non-category attribute is then calculated using Eq. (9);

sample information expectation of attribute A $$\text{Info}_A(D) = \sum_{j=1}^{v} \frac{|D_j|}{|D|} \times \text{Info}(D) \qquad (9)$$

information gain of attribute A $$\text{Gain}(A) = \text{Info}(D) - \text{Info}_A(D) \qquad (10)$$

information gain rate of attribute A $$\text{SplitInfo}(A) = -\sum_{j=1}^{v} \frac{|D_j|}{|D|} \times \log_2\left(\frac{|D_j|}{|D|}\right) \qquad (11)$$

$$\text{GainRatio}(A) = \frac{\text{Gain}(A)}{\text{SplitInfo}(A)}$$

where D is sample set; $D_j$ is number of sample of j th element included in attribute A;

Step 2.4 select a split attribute node: for non-category attributes such as daily energy production, reservoir level, and scheduling date, the gain rate of sample information corresponding to each attribute is calculated using the method of step 2.3; the non-category attribute with the largest gain rate is selected as a splitting node;

Step 2.5 repeat step 2.3 and step 2.4 until sub-node number obtained by splitting is same with the previous node;

for the downstream hydropower plant, the generation curve and daily energy production of upstream hydropower plant are added in the sample; the decision tree of generation scheduling of this plant can be established using steps 2.1-2.5.

3. The method for short-term generation scheduling of cascade hydropower plants coupling cluster analysis and decision tree according to claim 1, wherein, steps in step 1.4 are as follows:

Step 3.1 correction strategy for generation climb constraint when the generation climb constraint is violated, adjust generations at adjacent periods and keep total energy production at these periods unchanged; wherein the correction strategy steps are as follows:

Step 3.1.1 initial search is initiated from t=1 so that whether the climb constraint is violated at each period is determined;

Step 3.1.2 if $|N_{t+1}-N_t|>\overline{\Delta p}$, then start to search reverse change of generation climb from t+1 to t=1, and denote the searched period as j; thus, [j+1, t+1] is a period interval for continuous generation climb, whose length is defined as L; when L=1, there is only a violation between two adjacent periods;

Step 3.1.3 set generation difference between adjacent periods equal to upper limit of generation climb constraint, and thus determine generation increment at related periods with $\Delta N=\max\{(|N^{t+1}-N^t|-\overline{\Delta p})/(L+1), 0\}$; adjust generation at related periods using Eq. (12);

$$N_{t+1-n} = \begin{cases} N_{t+1-n} + \Delta N, (N_{t+1}-N_t > 0) \\ N_{t+1-n} - \Delta N, (N_{t+1}-N_t \leq 0) \end{cases}, n = \{0, 1, 2 \ldots L\} \quad (12)$$

Step 3.1.4 search backwards from t=1 until ending period of time horizon; if violation of generation climb constraints occurs at a period, then repeat the above steps until generation climb constraints at all periods are satisfied;

Step 3.2 correction strategy for generation limitation when operation generation profile does not meet the presented requirements, adjust the generation profile by controlling daily energy production; specific steps are as follows:

Step 3.2.1 determine combined restricted zones of hydropower plant: obtain the restricted zone O of each unit under current water head, and determine restricted zones of different unit combinations using set operation theory;

Step 3.2.2 correction strategy for the violation of restricted zone constraint: take Eq. (13) as correction criterion and check generation schedules at each period; if the generation at a period falls into a restricted zone, then Eq. (14) is used to adjust the generation;

$$(p_{i,t} - \overline{p}_{i,t}^o)(p_{i,t} - \underline{p}_{i,t}^o) > 0 \ \forall i, \forall t, \forall o \quad (13)$$

$$p_{i,t} = \begin{cases} \overline{p}_{i,t,k}^s, p_{i,t,k}^s \leq p'_{i,t} \leq \overline{p}_{i,t,k} \\ \underline{p}_{i,t,k}^s, \underline{p}_{i,t,k} < p'_{i,t} \leq \overline{p}_{i,t,k}^s \end{cases} \quad (14)$$

$$p_{i,t,k}^s = \frac{\overline{p}_{i,t,k}^s + \underline{p}_{i,t,k}^s}{2} \quad (15)$$

where $\overline{p}_{i,t}^o$, $\underline{p}_{i,t}^o$ are maximum and minimum of the o th restricted zone of plant i at period t, respectively; $p_{i,t}$ is corrected generation of plant i at period t; $p'_{i,t}$ is generation of plant i at period t, which falls into a restricted zone; $p_{i,t,k}^s$ is average generation of the k th restricted zone of plant i at period t;

Step 3.2.3 correction strategy for ideal generation point: if a hydropower plant has ideal generation constraints due to security requirements of power grid or operation efficiency, further adjust scheduled generation in order to approach the ideal generation point; define $\tilde{N}_{l1}$ and $\tilde{N}_{l2}$ as any two adjacent values in ideal generation point set A, and adjust the scheduled generation $N_t$ from t=1 to t=T, where A is ideal generation point set; check all elements of set A, make $\tilde{N}_{l1} \leq N_t \leq \tilde{N}_{l2}$ and adjust $N_t$ using Eq. (16);

$$N'_t = \begin{cases} \tilde{N}_{l1}, N_t < \frac{\tilde{N}_{l1}+\tilde{N}_{l2}}{2} \\ \tilde{N}_{l2}, N_t \geq \frac{\tilde{N}_{l1}+\tilde{N}_{l2}}{2} \end{cases} \quad (16)$$

Step 3.2.4 correction strategy for energy production: when the daily energy production of a hydropower plant after generation correction does not meet the given control condition, the daily energy production of this plant needs to be revised using the following steps; time intervals of peak load, waist load and valley load are determined according to load variation trend of receiving power grid, which are denoted as P, M, S, respectively; $E_0$, $E_1$ are defined as the given energy production and the corrected energy production, respectively; $\delta_E$ is defined as scale of energy production; $|\Delta E|<|\delta_E|$ are taken as convergence criterion, where $\Delta E=E_1-E_0$; when $\Delta E>0$, generations is adjusted to adjacent smaller ideal value in order of valley load, waist load and peak load until $|\Delta E|<|\delta_E|$ is satisfied; when $\Delta E<$generations are adjusted to adjacent larger ideal value in order of peak load, waist load and valley load until the convergence criterion is satisfied;

when $\Delta E>0$, specific steps are given as follows:

Step 3.2.4(a) adjust generation at the ith point in the set S using Eq. (17);

$$N_i'=\tilde{N}_{l1}, (t_i \in S, 1 \leq i \leq n) \quad (17)$$

where $\tilde{N}_{l1}$ is lower boundary of ideal interval of $N_i$; n is total number of points included in set S;

Step 3.2.4(b) calculate $\Delta E$; If $\Delta E>0$, then go back to Step 3.2.4(a) and adjust $N_{i+1}$; implement iteratively Step 3.2.4(a) for other points in set S; if $\Delta E<0$ at point k, then go to Step 3.2.4(c); after all points in set S are adjusted, if $\Delta E>0$ and $|\Delta E|>|\delta_E|$, then go back to Step 3.2.4(a) and continue to adjust other points in set M and P;

Step 3.2.4(c) because of sign change of $\Delta E$ at point k, adjusting interval of $N_k$ can be represented as $$C = \left[\frac{\Delta E - |\delta|}{\Delta t} + \tilde{N}_{l1}, \frac{\Delta E - |\delta|}{\Delta t} + \tilde{N}_{l1}\right];$$

with the consideration of restricted zone O, Eq. (18) is obtained;

$$N_k \in H, H=C-C \cap O \quad (18)$$

if $H \neq \emptyset$, then $N_{tk}'=\overline{h}$, where $\overline{h}$ is upper boundary of set H; if $H=\emptyset$, then $N_{tk}'=\overline{c}$, where $$\overline{c} = \frac{\Delta E - |\delta|}{\Delta t} + \tilde{N}_{l1};$$

in this situation, generation at point k falls into a restricted zone, the method in the above Step 3.2 is used to adjust the generation, and then procedure is returned back to step 3.2.4(b) for adjusting point k+1;

Step 3.2.4(d) when $|\Delta E| < |\delta_E|$, Step 3.2.4 will stop.

* * * * *